UNITED STATES PATENT OFFICE 2,405,559

COMPOSITIONS OF MATTER

Euclid W. Bousquet, Wilmington, Del., assignor to E. I. du Pont de Nemours & Company, Wilmington, Del., a corporation of Delaware No Drawing. Application September 3, 1943, Serial No. 501,135

3 Claims. (Cl. 260—326)

This invention relates to new compositions of matter, the amyl imides of 3,6-endomethylene-4-cyclohexene-1,2-dicarboxylic acid, and to fly spray compositions which contain the same as an essential active agent.

The control of flies and other household insects has been largely effected in the past through the instrumentality of pyrethrum fly sprays. Thiocyanates have been suggested as replacement for pyrethrum but because of their undesirable odor and irritating action the thiocyanates, except under war emergency conditions, have not been found useful in the household fly spray field. It has been found that part of the pyrethrum in household fly sprays may be replaced by N-isobutylundecylenamide. But, even so, there is still a need in the art for an agent which will displace greater amount of pyrethrum, which has now become a strategic material in view of the war emergency.

According to the present invention this desideratum is achieved through the instrumentality of the compounds, the amyl imides of 3,6-endomethylene-4-cyclohexene-1,2-dicarboxylic acid, which are highly toxic to flies and other insect pests and may be used in pyrethrum fly sprays to displace as much as 90% or more of the pyrethrum without loss of lethal and paralytic properties and up to 95% or more of the pyrethrum without loss of lethal properties and without substantial diminution of the paralytic property.

The compounds of the invention may be prepared from cyclopentadiene, maleic anhydride and an amyl amine or a mixture of amyl amines. The cyclopentadiene monomer is obtained by distilling cyclopentadiene dimer. This specially distilled cyclopentadiene monomer readily reacts with maleic anhydride according to the diene synthesis yielding the anhydride of 3,6-endomethylene-4-cyclohexene-1,2 - dicarboxylic acid. This anhydride is then refluxed with the amyl amine or mixture thereof to give the product, an N-amyl imide of 3,6-endomethylene-4-cyclohexene-1,2-dicarboxylic acid. The following example, in which the parts are by weight, is illustrative:

Example

Preparation of N-mixed amyl imide of 3,6-endomethylene-4-cyclohexene - 1,2 - dicarboxylic acid.

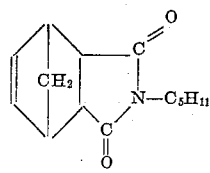

The anhydride of the above acid is first prepared by bubbling 132 g. of freshly distilled cyclopentadiene monomer (B. P. 41° C.) below the surface of a mixture of 196 g. of maleic anhydride and 352 g. of benzene at ordinary room temperature and injecting the cyclopentadiene as rapidly as is consistent with adequate reflux to prevent loss of reactant. This operation is complete in about 30 minutes.

195 grams of dry mixed amyl amines (a proprietary product, Sharples Solvent Corp., consisting of a mixture of various isomers as tert.-amyl, sec.-amyl, isoamyl, n-amyl, active-amyl amines and 2- and 3-amino pentane) is then added as rapidly as reflux capacity will permit. Water is removed from this mixture in an apparatus for refluxing and distilling it, separating the water and return of benzene to the reaction pot. After removal of 45 cc. of water by this procedure the benzene is distilled from the product leaving a residue with an acid number of 15.8. The crude acidic material amounting to 458 g. may be purified by direct distillation or by first alkaline scrubbing and then distillation. A satisfactory light-yellow product is obtained by scrubbing the crude reddish-colored acidic material with a slight excess of the theoretical amount of 5% sodium hydroxide solution which results in a loss of approximately 11% in the weight of the acidic product. The substantially neutral product is then further purified by distillation from a modified Claisen flask giving a colorless oil boiling at 144–148° C./3 mm. This remains as an oil at ordinary room temperatures and has a solubility in Deobase-kerosene above about 30% at 25° C. Analysis for nitrogen shows a content of 5.55% for the element.

In place of the mixed amyl amines there may be substituted n-amyl amine, isoamylamine and other isomeric amyl amines. The derivative from n-amyl amine, for example, may be prepared in a similar manner. It boils at 145–153° C./2 mm. and on analysis shows a content of 5.98 nitrogen, 71.73% carbon and 8.18 hydrogen. It has a solubility in Deobase-kerosene well above 50% at 25° C.

The amyl imides of this invention are of particular value in the preparation of fly sprays because of their remarkably high solubility in the refined kerosenes used as fly spray bases. This high solubility is a desirable if not an essential requirement in this art in view of the practice of making concentrates for distribution to various manufacturers. These concentrates are so formulated that by a proper degree of dilution, say 19 to 1, a class A or class AA, or class B insecticide may be produced as desired. To produce a fly spray containing 1% active ingredient on a 19 to 1 dilution the concentrate would have to contain 20% of the active ingredient and such a solution must be stable throughout all conditions of weather. Fly spray research in its most exacting form therefore is restricted by the necessity or desirability of finding a toxic series in which the optimum toxicity also coincides with optimum solubility. These very stringent requirements are met in the amyl imides of 3,6-endomethylene-4-cyclohexene-1,2-dicarboxylic acid. With the lower members of the series, for example, the n-butyl and isobutylimides, the solubility is not sufficiently high to provide a stable 20% solution whereas with the higher members toxicity falls off.

While the imides of the invention are particularly useful in household insecticides in the formulation of hydrocarbon fly sprays they are not so limited in utility. They may, for example, be used as mosquito repellents, de-lousing agents, and as contact insecticides in the agricultural field. They may further be used as plasticizers, as petroleum product assistants, and as intermediates in dyestuffs and pharmaceuticals.

While I have described my invention with reference to particular combinations it will be understood that variations may be made therein within the scope and spirit of the invention, in accordance with the scope of the appended claims.

I claim:

1. A composition of matter comprising an amyl imide of 3,6-endomethylene-4-cyclohexene-1,2-dicarboxylic acid.

2. A composition of matter comprising mixed amyl imides of 3,6-endomethylene-4-cyclohexene-1,2-dicarboxylic acid.

3. A composition of matter comprising n-amyl imide of 3,6 - endomethylene-4-cyclohexene-1,2-dicarboxylic acid.

EUCLID W. BOUSQUET.